United States Patent [19]

Stanton et al.

[11] 4,274,973

[45] Jun. 23, 1981

[54] AQUEOUS WATER-SOLUBLE SOAP LUBRICANT CONCENTRATES AND AQUEOUS LUBRICANTS CONTAINING SAME

[75] Inventors: James H. Stanton, Grosse Ile; Donald F. Garvin, Wyandotte, both of Mich.

[73] Assignee: The Diversey Corporation, Northbrook, Ill.

[21] Appl. No.: 51,008

[22] Filed: Jun. 22, 1979

[51] Int. Cl.$^3$ .................... C10M 1/32; C10M 1/06
[52] U.S. Cl. ............................. 252/34.7; 252/32; 252/33.3; 252/33.6; 252/42.1; 252/49.3; 252/49.5; 252/56 R
[58] Field of Search ............... 252/33.3, 33.6, 34.7, 252/42.1, 49.3, 49.5, 56 R, 32

[56] References Cited

U.S. PATENT DOCUMENTS 3,860,521   1/1975   Aepli et al. .................. 252/33.6 X

*Primary Examiner*—Andrew Metz
*Attorney, Agent, or Firm*—Merriam, Marshall & Bicknell

[57] ABSTRACT

The inclusion of neodecanoic acid in aqueous water-soluble soap lubricants reduces viscosity, and improves lubricity effectiveness.

8 Claims, 2 Drawing Figures

AQUEOUS WATER-SOLUBLE SOAP LUBRICANT CONCENTRATES AND AQUEOUS LUBRICANTS CONTAINING SAME

BACKGROUND OF THE INVENTION

1. Field of the Invention

This invention relates to improved soap-based lubricants, more particularly, chain conveyor lubricants and even more particularly, to aqueous compositions for such application containing fatty acid soaps.

2. Description of the Prior Art

In breweries, soft drink bottling operations and food processing plants, conveyors are used to move the bottles, jars, cans, and the like along the line. In order to keep the conveyor chains clean and provide lubrication, it is customary to use a lubricant such as an aqueous soap-based lubricant. These compositions also include chelating agents to prevent precipitation of calcium and magnesium soaps. These lubricants are generally manufactured and sold as concentrates which must then be diluted to in general about 1:100 with tap water at the point of use. However, prior to dilution, the concentrate is fed through proportioning pumps or injectors whereby it is important that the concentrated soaps which tend to be very viscous have their viscosity reduced. In the prior art, materials have been added to reduce viscosity of the concentrated lubricants, more particularly, propylene glycol, isopropyl alcohol, capric (decanoic) acid and coconut fatty acid. Also, some surfactants such as alkoxylated alcohols have been employed to reduce viscosity. However, antifreezes such as propylene glycol and isopropyl alcohol, while they may reduce viscosity to some extent, also may reduce lubricity. Natural materials such as capric (decanoic) acid and coconut fatty acid may reduce viscosity but lubricity is slightly reduced and they often require more chelating agents to handle the additional precipitates when diluted with normal tap water. Further, lubricants which contain capric or coconut fatty acid tend to cause an objectionable black film on the bottoms of the bottles and other containers passing along the conveyor. The surfactants generally have the disadvantages of higher costs, and an excess of surfactant sometimes cleans the metal surface to a point where lubricity may be lost completely.

Accordingly, it is the purpose of this invention to provide an aqueous soap-based lubricant particularly a lubricant for chain conveyors which has low viscosity, good lubricity, which does not blacken the bottoms of the bottles and cans or other containers when employed on conveyors and which does not require extra chelating agents to handle the additional precipitates when diluted with normal tap water.

STATEMENT OF RELEVANT PATENTS

To the best of applicants' knowledge, the following patents are the ones most relevant to a determination of patentability:

References

| U.S. Pat. No. | Inventor | Issue Date | Assignee |
| --- | --- | --- | --- |
| 3,923,671 | Knepp | 12/02/1975 | Aluminum Co. of Amer. |
| 3,663,438 | Smith et al | 05/16/1972 | Shell Oil Co. |

-continued

| U.S. Pat. No. | Inventor | Issue Date | Assignee |
| --- | --- | --- | --- |
| 2,863,847 | Morway | 12/09/1958 | Esso |

U.S. Pat. No. 3,923,671, Knepp—Discloses a metal working lubricant which comprises a combination of a carboxylic acid with other lubricating agents, i.e., carboxylic acid esters, emulsifiers and mineral oil. The carboxylic acid useful in the invention contains at least 12 carbon atoms.

U.S. Pat. No. 3,663,438, Smith—Discloses grease compositions comprising a mineral lubricating oil thickened to grease consistency having incorporated therein minor amounts of a phenothiazine-type inhibitor and a polyester of a $C_{1-20}$ alcohol and a $C_{3-20}$ carboxylic acid. Among the carboxylic acids listed are decanoic acid.

U.S. Pat. No. 2,863,847, Morway—Discloses lubricating compositions consisting of hydrous mixtures of metal salts of low molecular weight carboxylic acids and moderate molecular weight carboxylic acids and to sols, gels and greases containing the same. Among the intermediate molecular weight monocarboxylic acids disclosed are decanoic (capric).

The two latter patents do not disclose decanoic acid by itself as a grease additive but only compounds thereof. Further, there is no disclosure in either reference of even a compound of neodecanoic acid.

SUMMARY OF THE INVENTION

In accordance with this invention, there is provided in an aqueous water-soluble soap lubricant concentrate, most particularly for lubricating continuously moving conveyor systems, the improvement comprising the inclusion therein of neodecanoic acid in amount from about 0.1 to 50.0 percent by weight of the concentrate. The concentrate, when diluted with water, is then ready for use in a lubricating composition.

DESCRIPTION OF THE PREFERRED EMBODIMENTS

Figure 1:
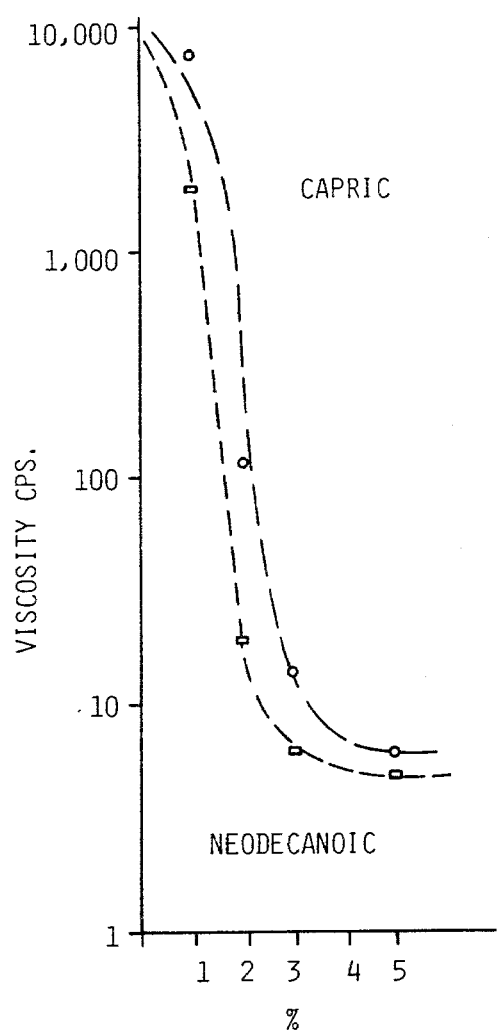

The typical chain conveyor lubricant for convenience and economy in transporting and storing is manufactured and sold as a concentrate which is then diluted with water in proportions by volume of from about 1:50 parts concentrate to water to about 1:500 parts concentrate to water for usage. The lubricant concentrate typically contains about 2 to 40 percent by weight water-soluble fatty acid soap, about 0 to 15 percent by weight chelating agent, about 0 to 45 percent by weight surface active agent which may be either anionic, nonionic or both, and about 20 to 80 percent by weight water. Usually, it is more preferred that the concentrate contain by weight about 4 to 20 percent water-soluble fatty acid soap, about 2 to 15 percent chelating agent, about 1 to 20 percent surface active agent and about 30 to 70 percent water.

According to this invention, neodecanoic acid is added to the foregoing composition to achieve the purposes of the present invention. Typically, the neodecanoic acid is added in an amount from about 0.1 to 50 percent by weight of the concentrate, more preferably, from about 0.5 to 5.0 percent by weight of the concentrate, and most preferably, about 1.0 to 3.0 percent by weight concentrate. While decanoic, also known as capric, acid has been well known in the art for years, the neoacids, which are synthetic highly-branched organic acids, are relatively new. The "neo" structure is generally considered to be as follows:

Commercially produced neodecanoic acid is composed of a number of $C_{10}$ isomers characterized by the presence of the above structure but in varying locations along the chain. It is generally a liquid with a low freezing point, i.e., less than $-40'$ C., whereas decanoic (capric) acid is a solid melting at 31.4° C. Neodecanoic acid is synthesized starting with an olefin of mixed nonenes (at equilibrium) yielding a $C_{10}$ neoacid containing many isomers. This very highly branched and multi-isomer acid combination yields a liquid $C_{10}$ neoacid with a typical hydrocarbon-type odor. A typical structure and isomer distribution for neodecanoic acid is set forth below.

TYPICAL ISOMER DISTRIBUTION FOR NEODECANOIC ACID $$R_3-\underset{\underset{R_2}{|}}{\overset{\overset{R_1}{|}}{C}}-COOH$$

| Alkyl group | % |
|---|---|
| $R_1$ and $R_2$ = methyl | 31 |
| $R_1$ = methyl; $R_2$ > methyl | 67 |
| $R_1$ and $R_2$ > methyl | 2 |
| $R_3$ always > methyl | |

This product is described in the article entitled "Neoacids: Synthetic Highly Branched Organic Acids," *Journal of American Oil Chemists Society*, Vol. 55, No. 4, pp. 342A to 345A (1978).

It is preferred to employ as the chelating agent salts of ethylene diamine tetraacetic acid. These sequestering agents may be added to the composition in the form of the salts or the acid may be added along with a sufficient amount of metallic hydroxide or alkanolamine to neutralize the acids. A preferred chelating agent is the tetrasodium salt of ethylene diamine tetraacetic acid.

Any chelating agent which will complex calcium and magnesium ions from water may be employed in this invention. Additional suitable chelating agents are trans-1,2-diaminocyclohexane tetraacetic acid monohydrate, diethylene triamine pentaacetic acid, sodium salt of nitrilotriacetic acid, pentasodium salt of N-hydroxyethylene diamine triacetic acid, trisodium salt of N,N-di(beta-hydroxyethyl)glycine, and sodium salt of sodium glucoheptonate.

Where the formula is diluted in tap water, conventional metallic soap dispersions may be necessary or desirable in addition to the chelating agents.

For the sake of simplicity in formulating the composition, instead of adding fatty acid soap as such, it is preferred to simply add fatty acid in amount from about 2 to 30 weight percent for the broad composition or 4 to 15 percent by weight of the preferred composition and then add a sufficient amount of an alkali metal (from the first column of the periodic table) hydroxide, ammonium hydroxide or an alkanolamine to neutralize the fatty acid to produce a fatty acid soap. Where the chelating agent is also added in the acid form, the foregoing hydroxide or alkanolamine is added in sufficient amount to neutralize both the chelating agent and the fatty acid. Preferred fatty acids for this purpose are tall oil fatty acids with low rosin content of about 0.5 to about 0.9 percent by weight and which generally comprise approximately 52 percent by weight oleic acid, 45 percent by weight linoleic acid, 1 percent by weight linolenic acid and 2.3 percent by weight saturated acid. Coconut oil fatty acids generally comprised of 50 percent lauric, 20 percent myristic, 10 percent oleic, 10 percent palmitic, 8 percent of other saturated fatty acids, and about 2 percent unsaturated fatty acids are also desirable for this purpose. Additional useful fatty acids include those derived from tallow, soya beans, corn, cotton seed, palm, and blends or hydrogenated forms of the basic type of fatty acid to give desired characteristics such as low solubilization temperature, viscosity and reduced corrosion tendency.

Sodium, ammonium or potassium hydroxide and mono, di, and triethanolamine or isopropanolamine are the preferred source used in neutralizing and converting fatty acids to soaps. Potassium hydroxide and monoethanolamine are preferred for their ability to produce compounds with a pH and foam generating capacity suitable for conveyor lubricants.

Conventional anionic and nonionic surface active agents are often also included in the composition. Anionic surface active agents which may be employed include linear alkyl benzene sulfonic acids, alpha-olefin sulfonates, alkyl diphenyl oxide disulfonates, sodium N-methyl-N-alkyl-taurate, alkyl sulfonated amides, di(2-ethylhexyl)sulfosuccinate, dioctyl sodium sulfosuccinate, sodium sulfonate of oleic acid, anionic phosphate esters, alkyl ether sulfates, alkyl polyethyleneoxy esters, alcohol sulfates such as sodium lauryl sulfonate, the product of chlorosulfonation of paraffin hydrocarbons, e.g., octadecenyl sulfonate and the condensate of a fatty acid chloride with an amine.

The nonionic surface active agents which are advantageously employed in the compositions of the invention are generally the polyoxyalkylene adducts of hydrophobic bases wherein the oxygen/carbon atom ratio in the oxyalkylene portion of the molecule is greater than 0.40. Those compositions which are condensed with hydrophobic bases to provide a polyoxyalkylene portion having an oxygen/carbon atom ratio greater than 0.40 include ethylene oxide, butadiene dioxide and glycidol, mixtures of these alkylene oxides with each other and with minor amounts of propylene oxide, butylene oxide, amylene oxide, styrene oxide, and other higher molecular weight alkylene oxides. Ethylene oxide, for example, is condensed with the hydrophobic base in an amount sufficient to impart water dispersibility or solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates.

Typical hydrophobic bases which can be condensed with ethylene oxide in order to prepare nonionic surface active agents include mono- and polyalkyl phenols, polyoxypropylene condensed with a base having from about 1 to 6 carbon atoms and at least one reactive hydrogen atom, fatty acids, fatty amines, fatty amides and fatty alcohols. The hydrocarbon ethers such as the benzyl or lower alkyl ether of the polyoxyethylene surfactant condensates are also advantageously employed in the compositions of the invention.

Among the suitable nonionic surface active agents are the polyoxyethylene condensates of alkyl phenols having from about 6 to 20 carbon atoms in the alkyl portion and from about 5 to 30 ethenoxy groups in the polyoxyethylene radical. The alkyl substituent on the aromatic nucleus may be octyl, diamyl, n-dodecyl, polymerized propylene such as propylene tetramer and trimer, isooctyl, nonyl, etc. The benzyl ethers of the polyoxyethylene condensates of monoalkyl phenols impart good properties to the compositions of the invention and a typical product corresponds to the formula:

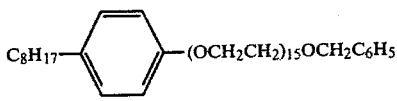

Higher polyalkyl oxyethylated phenols corresponding to the formula:

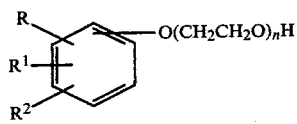

wherein R is hydrogen or an alkyl radical having from about 1 to 12 carbon atoms, $R^1$ and $R^2$ are alkyl radicals having from about 6 to 16 carbon atoms and n has a value from about 10 to 40, are also suitable as nonionic surface active agents. A typical oxyethylated polyalkyl phenol is dinonyl phenol condensed with 14 moles of ethylene oxide.

Other suitable nonionic surface active agents are cogeneric mixtures of conjugated polyoxyalkylene compounds containing in their structure at least one hydrophobic oxyalkylene chain in which the oxygen/carbon atom ratio does not exceed 0.40 and at least one hydrophilic oxyalkylene chain in which the oxygen/carbon atom ratio is greater than 0.40.

Polymers of oxyalkylene groups obtained from propylene oxide, butylene oxide, amylene oxide, styrene oxide, mixtures of such oxyalkylene groups with each other and with minor amounts of polyoxyalkylene groups obtained from ethylene oxide, butadiene dioxide, and glycidol are illustrative of hydrophobic oxyalkylene chains having an oxygen/carbon atom ratio not exceeding 0.40. Polymers of oxyalkylene groups obtained from ethylene oxide, butadiene dioxide, glycidol, mixtures of such oxyalkylene groups with each other and with minor amounts of oxyalkylene groups obtained from propylene oxide, butylene oxide, amylene oxide and styrene oxide are illustrative of hydrophilic oxyalkylene chains having an oxygen/carbon atom ratio greater than 0.40.

Further suitable nonionic surface active agents are the polyoxyethylene esters of higher fatty acids having from about 8 to 22 carbon atoms in the acyl group and from about 8 to 30 ethenoxy units in the oxyethylene portion. Typical products are the polyoxyethylene adducts of tall oil, rosin acids, lauric, stearic and oleic acids and the like. Additional nonionic surface active agents are the polyoxyethylene condensates of higher fatty acid amines and amides having from about 8 to 22 carbon atoms in the fatty alkyl or acyl group and about 10 to 30 ethenoxy units in the oxyethylene portion. Illustrative products are coconut oil fatty acid amines and amides condensed with about 10 to 30 moles of ethylene oxide.

Other suitable polyoxyalkylene nonionic surface active agents are the alkylene oxide adducts of higher aliphatic alcohols and thioalcohols having from about 8 to 22 carbon atoms in the aliphatic portion and about 3 to 50 in the oxyalkylene portion. Typical products are synthetic fatty alcohols, such as n-decyl, n-undecyl, n-dodecyl, n-tridecyl, n-tetradecyl, n-hexadecyl, n-octadecyl and mixtures thereof condensed with 3 to 50 moles of the ethylene oxide, a mixture of normal fatty alcohols condensed with 8 to 20 moles of ethylene oxide and capped with benzyl halide or an alkyl halide, a mixture of normal fatty alcohols condensed with 10 to 30 moles of a mixture of ethylene and propylene oxides, a mixture of several fatty alcohols condensed sequentially with 2 to 20 moles of ethylene oxide and 3 to 10 moles of propylene oxide, in either order; or a mixture of normal fatty alcohols condensed with a mixture of propylene and ethylene oxides, in which the oxygen/carbon atom ratio is less than 0.40 followed by a mixture of propylene and ethylene oxides in which the oxygen/carbon atom ratio is greater than 0.40 or a linear secondary alcohol condensed with 3 to 30 moles of ethylene oxide, or a linear secondary alcohol condensed with a mixture of propylene and ethylene oxides, or a linear secondary alcohol condensed with a mixture of ethylene, propylene, and higher alkylene oxides.

The compositions of this invention are prepared by standard well-known open kettle mixing techniques known in the industry.

The practice of this invention is illustrated by the examples given below. Unless otherwise noted, temperature is expressed in degrees Centigrade and parts and percentages are by weight.

Laboratory tests were conducted to compare viscosities, lubricities, and maximum dilutions in terms of effectiveness value of neodecanoic acid with various materials previously used in the industry as viscosity reducers. The results are shown in the Table below.

The viscosities were run with a Brookfield viscosity meter at 25° C. Viscosities below 100 cps are considered ideal. Maximum dilution was determined by adding 6 grain water hardness tap water at 20° C. to 1 gram of concentrated lubricant until the solution becomes cloudy. The friction-power coefficient, which is a measure of lubricity, is determined on a 5-foot section of an actual industrial bottle conveyor chain. The unit is powered by a DC motor and a Servodyne control unit from Cole-Parmer Instrument Company. The Servodyne unit measures motor torque. A Varian Recorder, Model 9176, then records the changes in power as the lubricant is added to the conveyor chain. A load consists of 10 to 12 bottles filled with water and the lubricated chain slides under the restricted bottles. The friction-power coefficient indicates the average recorded value during a 30-minute run using a dilution with tap water at 1:80.

The effectiveness value (E) at a specific concentration of these materials is determined with the following equation:

$$E = (100 \times D)/(V \times F)$$

where
E = Effectiveness value

V = Viscosity cps
F = Friction-power coefficient as measured on lab lube tester
D = Maximum dilution (with 6 grain tap water)

In order to compare a series of viscosity reducers, a standard water-based formula was prepared as follows:

| Ingredients | Parts by Weight |
| --- | --- |
| Water | 74 |
| Tetrasodium Salt of Ethylenediamine-tetraacetic acid | 4 |
| Tall Oil Fatty Acid | 12 |
| KOH, 45% aqueous solution | 6 |
| Surfactant* | 1 |
| | 97 |

*The surfactant was an oxyalkylated alcohol from 22 percent by weight $C_{12-15}$ fatty alcohol, 47 percent by weight ethylene oxide and 31 percent by weight propylene oxide.

To 97 parts by weight of the above formula, 2 parts by weight viscosity reducing agent was added. One part by weight of either water or 45 percent aqueous KOH solution or mixture thereof was added in order to maintain the same desired pH of 10.0.

TABLE

| Viscosity Reducing Agent 2% by wt. | V Viscosity cps | D Max. Dilution 6 grain water | F Friction Power Coefficient | E Effectiveness Value |
| --- | --- | --- | --- | --- |
| Water | 10,000 | 1:85 | 5.40 | 1.60 |
| Capric acid | 125 | 1:90 | 5.55 | 129.70 |
| Neodecanoic acid | 20 | 1:100 | 5.48 | 912.40 |
| Coconut fatty acid | 9,600 | 1:90 | 5.60 | 1.67 |
| Surfactant* | 680 | 1:100 | 5.65 | 26.00 |
| Propylene glycol | 2,900 | 1:110 | 5.55 | 6.80 |
| Isopropyl alcohol | 1,200 | 1:110 | 5.60 | 16.40 |

*The surfactant was an oxyalkylated alcohol from 22 percent by weight $C_{12-15}$ fatty alcohol, 47 percent by weight ethylene oxide and 31 percent by weight propylene oxide.

Figure 2:
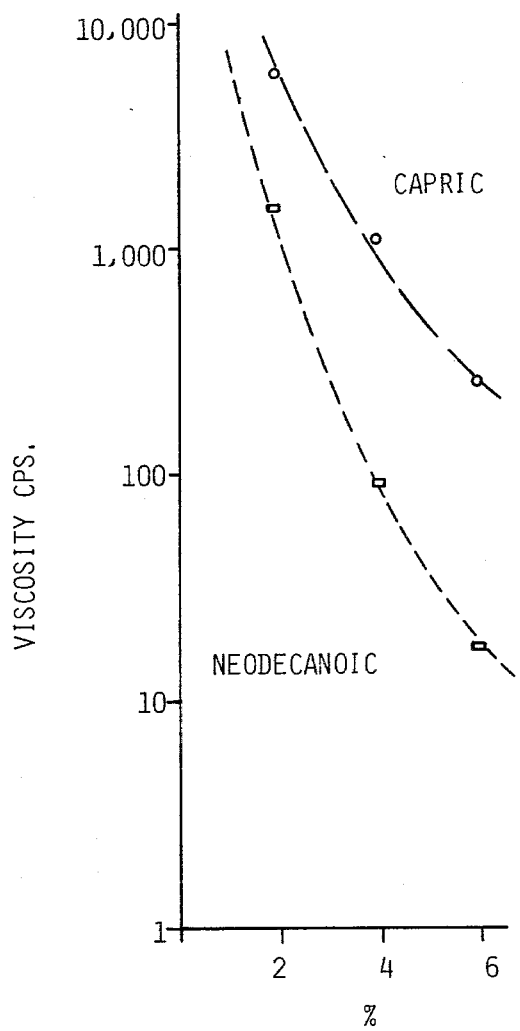

A further study was made to compare viscosity reducing characteristics of neodecanoic acid to capric acid, the results of which are shown in FIGS. 1 and 2 of the drawing wherein:

FIG. 1 shows the viscosities for a water-based formula, similar to that set forth above, with neodecanoic acid and with capric (decanoic) acid in varying amounts up to 5 percent by weight of the concentrate. The formula consisted of by weight 12 percent tall oil fatty acid, 4 percent tetrasodium salt of ethylenediamine tetraacetic acid and 1 percent surfactant. Sufficient KOH and water were added to maintain a pH of 10 and to make up the balance for a total of 100 percent.

FIG. 2 shows the viscosities with neodecanoic acid and with capric (decanoic) acid in varying amounts up to 6 percent by weight of the concentrate for another more viscous formula consisting of by weight 18 percent tall oil fatty acid, 4 percent tetrasodium salt of ethylenediamine tetraacetic acid and 1 percent surfactant. Sufficient KOH and water were added to maintain a pH of 10.0 and to make up the balance for a total of 100 percent. Higher concentrations of tall oil fatty acid produce much higher viscosities and the viscosity reducing characteristics of neodecanoic acid become more apparent in the more concentrated products.

The foregoing examples and methods have been described in the foregoing specification for purpose of illustration. Many other modifications will naturally suggest themselves to those skilled in the art based on this disclosure. These are intended to be comprehended as being within the scope of this invention.

What is claimed is:

1. In an aqueous water-soluble soap lubricant concentrate, the improvement comprising the inclusion therein of neodecanoic acid in amount from about 0.1 to 50.0 percent by weight of said concentrate.

2. An aqueous water-soluble soap lubricant concentrate comprising 2 to 40 percent by weight water-soluble fatty acid soap, about 0 to 15 percent by weight chelating agent, about 0 to 45 percent by weight surfactant, from 20 to 80 percent by weight water, and about 0.1 to 50.0 percent by weight neodecanoic acid.

3. The concentrate of claim 2 wherein said concentrate contains a chelating agent.

4. The concentrate of claim 3 wherein said concentrate includes a surfactant.

5. The concentrate of claim 2 wherein the fatty acid soap is obtained by incorporating in said concentrate a fatty acid in an amount from about 2 to 30 weight percent along with an agent selected from the group consisting of alkali metal hydroxide, ammonium hydroxide, and alkanolamines in amounts sufficient to react with the fatty acid to produce the fatty acid soap.

6. The concentrate of claim 5 wherein said fatty acid is tall oil fatty acid, said agent to react with the fatty acid is potassium hydroxide, said chelating agent is tetrasodium salt of ethylene diamine tetraacetic acid, and said surface active agent is an oxyalkylated fatty alcohol from 22 percent by weight $C_{12-15}$ fatty alcohol, 47 percent by weight ethylene oxide and 31 percent by weight propylene oxide.

7. A lubricating composition consisting essentially of the concentrate according to claim 2 and water in a volumetric proportion of concentrate to water of about 1:50 to about 1:500.

8. A lubricating composition consisting essentially of the concentrate according to claim 5 and water in a volumetric proportion of concentrate to water of about 1:50 to about 1:500.

* * * * *